United States Patent [19]
Mathias

[11] 3,821,839
[45] July 2, 1974

[54] DEVICE FOR LOCATING OUTLET BOXES ON STUDS

[76] Inventor: Clifford L. Mathias, 51 Raeburn Ave., Rochester, N.Y. 14619

[22] Filed: May 4, 1973

[21] Appl. No.: 357,490

[52] U.S. Cl............................ 29/203 P, 29/212 R
[51] Int. Cl. ..................... H05k 13/00, B23q 7/10
[58] Field of Search .......... 29/203 P, 212 R, 212 D, 29/200 P

[56] References Cited
UNITED STATES PATENTS
2,480,037  8/1949  Luckins............................ 29/212 R
3,621,553  11/1971  Lafeber............................ 29/200 P Primary Examiner—Thomas H. Eager
Attorney, Agent, or Firm—Shlesinger, Fitzsimmons & Shlesinger

[57] ABSTRACT

A magazine for slidably housing a row of rectangularly shaped electrical outlet boxes is mounted on the upper end of a telesocpic stand, which can be adjusted to position the magazine selectively at different heights. A stop pivotally mounted on the magazine normally projects across its outlet end to limit the extent which the foremost box in the magazine projects out of the magazine. A foot on the bottom of the stand is engageable with a sill to support the stand vertically adjacent a stud; and a flange on the magazine is engageable with the outer face of the stud to position the foremost box along the side of the stud. Two nails that are embedded part-way into the box can then be hammered into the stud; after which the stop member is tripped to release the nailed box and allow its withdrawal from the magazine.

10 Claims, 3 Drawing Figures

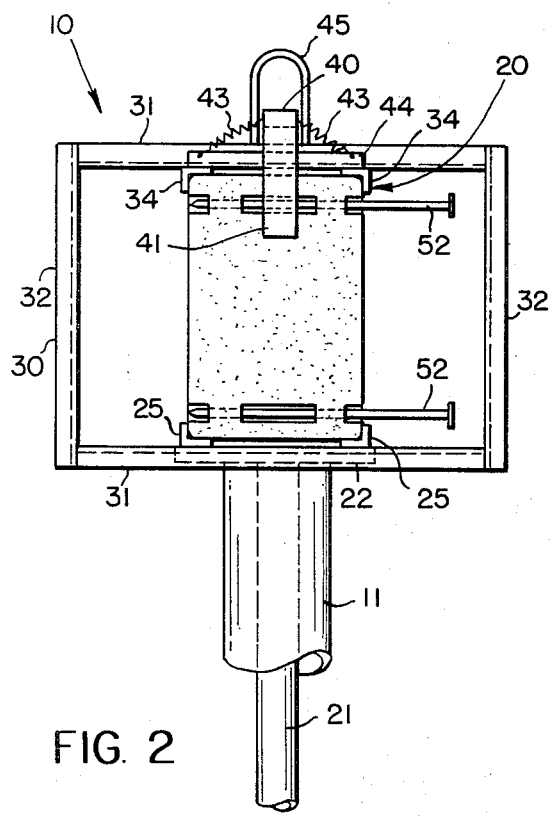
FIG. 2
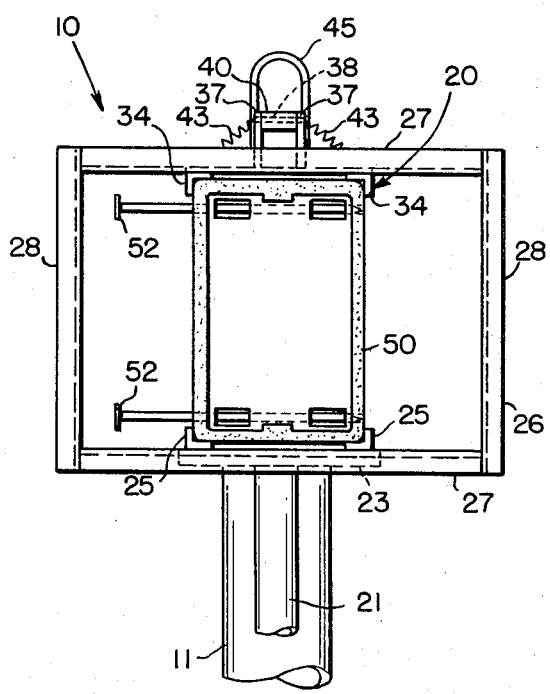
FIG. 3
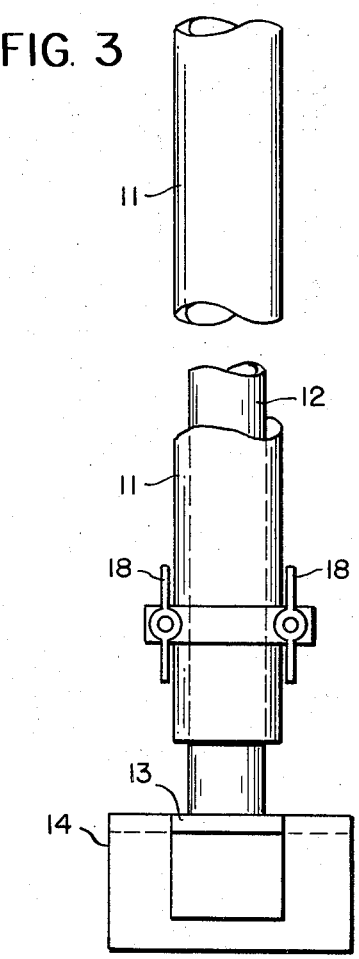

DEVICE FOR LOCATING OUTLET BOXES ON STUDS

This invention relates to apparatus for making electrical installations in buildings, and more particularly to a device for locating electrical outlet boxes in correct positions on studs to which the boxes are to be secured.

During the installation of electrical wiring in newly constructed homes, or other buildings, it is necessary for the electrician to secure electrical outlet boxes on wall studs wherever electrical outlets are desired. Heretofore the electrician has had to measure from the floor upwardly to locate each outlet box at the desired height on the stud to which it is to be attached; and thereafter has had to nail the box to the stud while holding it firmly against the stud with his hand.

A major disadvantage of this manner of installing outlet boxes is that a great deal of time is wasted by an electrician in locating the several boxes that are required to be installed in a room or in a home, at the proper heights on the studs to which they are to be attached. A tape measure or the like, must be used to measure from the floor upwardly on each stud to locate the outlet box at the desired height to which they are to be attached. Further, it is difficult for the electrician to hold a box steadily in the proper position on the stud during nailing. Consequently boxes are often mounted improperly — e.g., slightly tilted relative to the stud.

It is an object of this invention to provide apparatus for simplifying the operation of gauging the height on studs at which outlet boxes are to be fastened.

Another object of this invention is to provide apparatus of this type that can be adjusted readily to locate outlet boxes properly at different levels on studs for installation.

Still another object of this invention is to provide a constructional aid capable of holding a plurality of electrical outlet boxes, and operable to feed the boxes one after another, into nailing position against the studs to which they are to be attached.

Other objects of the invention will be apparent hereinafter from the specification and from the recital of the appended claims, particularly when read in conjunction with the accompanying drawings.

In the drawings:

FIG. 2 is a fragmentary front elevational view of this device as seen when looking at the left end of FIG. 1; and FIG. 3 is a fragmentary elevational view looking at the other end of the device.

Figure 1:
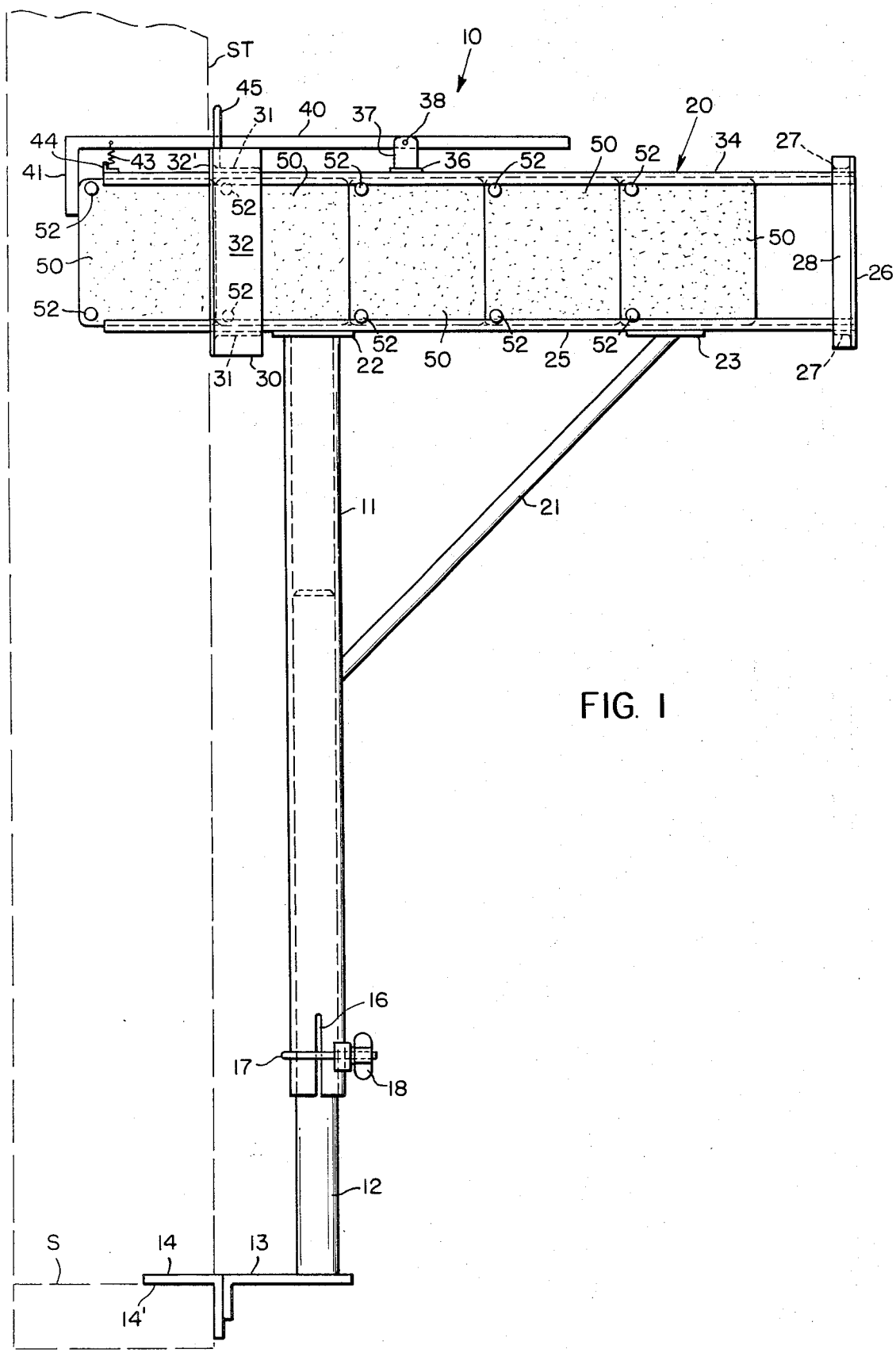
FIG. 1 is a fragmentary side elevational view of a device made according to one embodiment of this invention for accurately positioning successively a plurality of electrical outlet boxes on wall studs during the construction of a new home or the like, one such wall stud and its sill being shown in broken lines.

Referring now to the drawings by numerals of reference, 10 denotes generally a locating device comprising a tubular post 11 which is telescopically slidable on the upper end of a cylindrical column 12. Secured to the lower end of column 12 by a plate 13 is a right-angularly shaped foot 14, which is suitable for supporting the device on the sill S of a room. The lower end of post 11 has therein one or more axially extending slots 16, and may be clamped by a conventional clamp 17 and wingnuts 18 in any desired vertical position on column 12.

Mounted on the upper end of post 11 is a magazine, denoted generally at 20, for holding a plurality of electrical outlet boxes 50. This magazine is mounted on a pair of spaced parallel support plates 22 and 23, which are secured, respectively, to the upper end of a post 11, and to the upper end of a diagonal brace 21, which is fastened at its lower end to post 11 above clamp 17. The magazine comprises two, elongate, right-angular guide members 25 mounted in spaced, parallel relation to each other. Secured to rear ends of guide members 25 to project thereabove vertically is a rectangular yoke 26, which, in the embodiment illustrated, comprises a pair of vertically-spaced, parallel angle irons 27, opposite ends of which are welded or otherwise secured to a pair of horizontally spaced, parallel angle irons 28.

A second rectangular yoke 30 is secured to the guide members 25 adjacent their forward ends to project thereabove parallel to the rear yoke 26. Yoke 30 comprises a pair of vertically spaced, parallel angle irons 31, which are secured to opposite ends of a pair of laterally spaced, parallel angle irons 32.

Secured intermediate their ends to the undersides of the upper portions 27 and 31 of yokes 26 and 30, and extending parallel to each other and in vertical registry with the lower guide members 25, are two upper guide members 34, which also are right-angular in cross section. Secured at opposite ends thereof to guide members 34, and extending transversely therebetween rearwardly of yoke 30, is a bracket 36. Pivoted adjacent its rear end on a pin 38, which is mounted to extend between ears 37 of bracket 36, is a lever 40. This lever extends forwardly over yoke 30 and beyond the forward ends of guide members 25 and 34. At its front end it is bent at right angles to form a stop 41.

Adjacent its forward end lever 40 is connected by a pair of springs 43 to a bar 44, which is secured on members 34 to extend transversely thereacross. Springs 43 normally hold lever 40 downwardly against the top of yoke 30 as illustrated in FIG. 1. An inverted U-shaped loop 45, opposite ends of which are secured to the top of the yoke 30 overlies lever 40 to limit pivotal movement thereof in a clockwise direction (FIG. 1) about pin 38.

For use, the post 11 is adjusted on column 12 to position the magazine at the height at which it is desired that the outlet boxes be affixed to the studs of a room, and the magazine 20 is loaded by feeding a plurality of molded, plastic electrical outlet boxes 50 of conventional form, closed ends forward and having a pair of nails 52 already driven partway through the holes in them, one behind the other through yoke 26 into guides 25 and 34 until the first or innermost box engages the stop 41 on lever 40.

Yoke 30 is spaced rearwardly from stop 41 so that when the front face 32' (FIG. 1) of one of the angle irons 32 is seated against the outside face of a stud, the foremost outlet box in the magazine will be the correct fore and aft position for nailing to a stud. With the foot 14 seated on a sill S (FIG. 1) against the stud ST to which a box is to be attached, then the first or lead box 50 in the magazine is in position to be secured to the stud. The operator can then hammer the two nails 52 into the stud. Then the operator presses down on the rear end of lever 40 to disengage stop 41 from the lead box 50 so that it will slide out of magazine 20 as device 10 is pulled away from the stud. When lever 40 is released, springs 43 return stop 41 to blocking position so that the column of boxes remaining in the magazine can be pushed forwardly, and the next box 50 in the magazine will be in position to be nailed to the next stud. The worker can thus proceed from stud to stud locating and nailing successive outlet boxes quickly to studs. It is no longer necessary for him to measure along each stud to locate boxes at the correct heights.

When the magazine 20 is emptied, it may be refilled with more boxes through frame 26 at the inlet end of the magazine.

With this device, a plurality of outlet boxes can be located at the same height on different studs, and can be installed very rapidly and with a greater degree of accuracy than was heretofore possible. For boxes that are to be installed close to the floor, the lower part of the telescoping post (column 12 and its attached foot 14) can be removed for positioning the outlet boxes at correct lower heights for nailing to associated studs.

From the foregoing it will be apparent that the instant invention provides a relatively simple and inexpensive device for accurately and rapidly locating a plurality of electrical outlet boxes at predetermined heights on studs during the construction of buildings. The device not only permits accurate installation at desired, predetermined levels on the studs, but also forms ready means for supporting the boxes by one hand, thus leaving the other hand of the operator free to hammer the partially inserted nails into the studding.

While the invention has been described in connection with a specific embodiment thereof, it will be understood that it is capable of further modification, and this application is intended to cover any modifications of the invention that come within its scope or the recital of the appended claims.

Having thus described my invention, what I claim is:

1. A device for locating electrical outlet boxes relative to studs to which they are to be attached, comprising
   portable supporting means,
   a magazine mounted on said supporting means,
   said magazine being open at both ends to receive a plurality of electrical outlet boxes therein in tandem arrangement,
   a movable stop member mounted on said magazine normally to project beyond one end thereof across the opening in said one end to engage the lead box in the magazine, and
   means for adjusting said magazine vertically on said supporting means to place said lead box at a predetermined level relative to a stud, when the post is adjacent the stud,
   said stop member being movable manually to an inoperative position in which it disengages said lead box to permit it to slide out of said magazine after the box has been secured to said stud.

2. A device as defined in claim 1, having
   a foot projecting laterally from the lower end of said supporting means to locate said magazine relative to the floor of a room containing a stud to which an outlet box is to be fastened, and
   said magazine having an external shoulder in a plane normal to the plane of said foot and engageable with the outer face of the stud to locate said lead box fore and aft of the stud.

3. A device as defined in claim 2, wherein
   said supporting means comprises a pair of telescopically connected sections,
   said magazine is secured to one of said sections,
   said foot is secured to the other of said sections, and said adjusting means comprises a clamp releasably secured around the outer section of said supporting means releasably to squeeze it frictionally against the inner section of said supporting means to prevent sliding movement between said sections.

4. A device as defined in claim 2, wherein said foot is right-angular in configuration and is disposed to have one leg thereof overlie a sill upon which the lower end of a stud is seated, and to have its other leg engage the outer face of said sill.

5. A device as defined in claim 2, wherein
   said stop member comprises a lever pivotally mounted adjacent one end thereof on said magazine at one side of said shoulder, and having a depending portion projecting at its opposite end over said shoulder and down in stop position beyond said one end of the magazine, and
   resilient means is interposed between said magazine and said lever normally to urge said lever into an operative position in which said depending portion prevents discharge of a box from said magazine.

6. A device as defined in claim 1, wherein said magazine comprises
   a first pair of spaced, parallel guide members secured intermediate their ends on said supporting means and projecting beyond opposite sides thereof, and means supporting a second pair of spaced, parallel guide members above and in registry with said first pair, said two pairs of guide members defining an elongate rectangular passage for slidably housing therein a row of outlet boxes.

7. A device for locating rectangularly shaped electrical outlet boxes relative to studs to which they are to be attached, comprising
   a telescopic post,
   a foot on the lower end of said post for supporting the post on a floor sill adjacent a stud to which an outlet box is to be secured,
   a plate secured on the upper end of said post transversely thereof,
   a pair of spaced, parallel guide members secured on said plate and extending beyond opposite sides of said post,
   a pair of rectangularly shaped frame members secured to said guide members at opposite sides of said plate to project above said members in spaced, parallel planes,
   a second pair of spaced, parallel guide members secured intermediate their ends to said frame members to be supported thereby above and in registry with said first pair of guide members,
   each of said guide members having a right-angular shape, and said guide members together bounding a passage to house a row of outlet boxes in tandem fashion and in which said boxes are slidable one after the other into or out of the ends of said passage, a stop member mounted on said guide members for movement manually into and out of a position in which it extends across one end of said passage to prevent withdrawal of a box therefrom, and releasable clamping means on said post for securing the telescopic sections thereof in vertically adjusted position relative to said foot, thereby to position said passage at a desired height relative to a stud, said guide members being disposed to support the foremost box in said passage in registry with the stud to which it is to be attached.

8. A device as defined in claim 7 wherein one of said frame members is spaced longitudinally inwardly from said one end of said passage, and said one frame member has thereon a lateral flange engageable with the outer face of a stud so as to position the foremost box in said passage a predetermined distance inwardly along the side of the stud.

9. A device as defined in claim 7, wherein the rectangular openings defined by the frame members are wider than the passage defined by said guide members, whereby said frame members do not interfere with nails partially projecting from one side of the boxes.

10. A device for locating electrical outlet boxes relative to studs to which they are to be attached, comprising a vertically adjustable support, a magazine mounted on said support and open at both ends to provide inlet and outlet openings through which outlet boxes can be fed and discharged, means in said magazine for holding a plurality of outlet boxes arranged in tandem fashion, means for positioning said support to locate said magazine at a selected height relative to a stud, stop means on said magazine for limiting the extent to which the forward end of the foremost box can project out of the magazine, and means on the magazine engageable with the outer face of the stud to locate the rear end of said foremost box relative to the stud.

* * * * *